(12) United States Patent
Gard et al.

(10) Patent No.: US 9,644,432 B2
(45) Date of Patent: May 9, 2017

(54) THREADED TUBULAR COMPONENT AND RESULTING CONNECTION

(71) Applicants: VALLOUREC OIL AND GAS FRANCE, Aulnoye-Aymeries (FR); NIPPON STEEL & SUMITOMO METAL CORPORATION, Chiyoda-ku (JP)

(72) Inventors: Eric Gard, Fontaines sur Saone (FR); Eliette Pinel, Sainte-Euphemie (FR); Mikael Petit, Villefranche sur Saone (FR)

(73) Assignees: VALLOUREC OIL AND GAS FRANCE, Aulnoye-Aymeries (FR); NIPPON STEEL & SUMITOMO METAL CORPORATION, Chiyoda-ku (JP)

( * ) Notice: Subject to any disclaimer, the term of this patent is extended or adjusted under 35 U.S.C. 154(b) by 274 days.

(21) Appl. No.: 14/348,711

(22) PCT Filed: Oct. 4, 2012

(86) PCT No.: PCT/EP2012/004153
§ 371 (c)(1),
(2) Date: Mar. 31, 2014

(87) PCT Pub. No.: WO2013/053450
PCT Pub. Date: Apr. 18, 2013

(65) Prior Publication Data
US 2014/0238661 A1   Aug. 28, 2014

(30) Foreign Application Priority Data
Oct. 14, 2011   (FR) .................................... 11 03140

(51) Int. Cl.
*E21B 17/042*  (2006.01)
*E21B 17/00*   (2006.01)
*F16B 33/06*   (2006.01)

(52) U.S. Cl.
CPC ............ *E21B 17/00* (2013.01); *E21B 17/042* (2013.01); *C10M 2205/0285* (2013.01);
(Continued)

(58) Field of Classification Search
CPC ..................................................... E21B 17/042
See application file for complete search history.

(56) References Cited

U.S. PATENT DOCUMENTS 3,746,068 A   7/1973   Deckert et al.
3,814,156 A   6/1974   Bachmann et al.
(Continued)

FOREIGN PATENT DOCUMENTS

| GB | 2 272 446 | 5/1994 |
|----|-----------|--------|
| WO | 2010/073120 | 7/2010 |
| WO | 2011/076350 | 6/2011 |

OTHER PUBLICATIONS

International Search Report Issued Mar. 15, 2013 in PCT/EP12/004153 Filed Oct. 4, 2012.
U.S. Appl. No. 14/316,351, filed Jun. 26, 2014, Bordet, et al.
U.S. Appl. No. 14/369,345, filed Jun. 27, 2014, Gard, et al.
Wacker Silicones, Wacker AK 350, Silicone Fluid, Version:1.0, 2008, 2 pages.

*Primary Examiner* — Catherine Loikith
(74) *Attorney, Agent, or Firm* — Oblon, McClelland, Maier & Neustadt, L.L.P.

(57) ABSTRACT

A threaded tubular component configured for drilling or working hydrocarbon wells, the tubular component including, at one of its ends, a threaded zone formed on its external or internal peripheral surface depending on whether the threaded end is male or female in type. The end portion is at least partially coated with a dry film, including a thermo-
(Continued)

plastic or thermoset matrix including microcapsules filled with compounds in liquid form.

14 Claims, 4 Drawing Sheets

(52) U.S. Cl.
CPC ............. *C10M 2207/2805* (2013.01); *C10M 2207/2855* (2013.01); *C10M 2209/0625* (2013.01); *C10M 2209/0845* (2013.01); *C10M 2209/1033* (2013.01); *C10M 2213/0606* (2013.01); *C10M 2217/041* (2013.01); *C10M 2229/025* (2013.01); *C10N 2220/021* (2013.01); *C10N 2220/022* (2013.01); *C10N 2220/082* (2013.01); *C10N 2230/06* (2013.01); *C10N 2250/141* (2013.01); *C10N 2250/16* (2013.01); *F16B 33/06* (2013.01)

(56) References Cited

U.S. PATENT DOCUMENTS

| | | |
|---|---|---|
| 5,821,293 A | 10/1998 | Roesch et al. |
| 5,877,236 A | 3/1999 | Roesch et al. |
| 5,922,798 A | 7/1999 | Roesch et al. |
| 6,375,872 B1 | 4/2002 | Chao |
| 6,960,555 B2 * | 11/2005 | Anthony ............. C10M 125/18 106/218 |
| 2009/0123226 A1 | 5/2009 | Viegener |
| 2010/0155250 A1 | 6/2010 | Churruca et al. |
| 2012/0169048 A1 | 7/2012 | Pinel et al. |
| 2012/0312527 A1 | 12/2012 | Pinel et al. |
| 2013/0075083 A1 | 3/2013 | Gard et al. |
| 2013/0193682 A1 | 8/2013 | Gard et al. |
| 2013/0320665 A1 | 12/2013 | Gard et al. |

\* cited by examiner

THREADED TUBULAR COMPONENT AND RESULTING CONNECTION

The present invention relates to a tubular element used for drilling and/or working hydrocarbon wells, and more precisely to the threaded end of such an element. Such an end may be male or female in type and is capable of being connected to a corresponding end of an analogous element to form a connection.

The invention also relates to a threaded connection resulting from connecting two tubular elements together by makeup.

The term "tubular element intended for drilling and working hydrocarbon wells" means any element which is substantially tubular in shape intended to be connected to another element of the same type or otherwise in order to constitute, in particular, either a string for drilling a hydrocarbon well or a riser intended for maintenance (also known as work-over risers) or for working such wells, such as a riser, or a casing string or tubing string used in working wells. The invention is also applicable to elements used in a drill string such as, for example, drill pipes, heavy weight drill pipes, drill collars and the portions of pipe connections and heavy weight pipes known as tool joints.

Each tubular component comprises an end portion provided with a male threaded zone or a female threaded zone intended to be made up with a corresponding end portion of an analogous element. Once connected, the elements compose what is termed a connection.

Such threaded tubular components of a connection are connected under defined loads in order to satisfy the requirements for an interference fit and seal imposed by the service conditions. Further, it should be known that the threaded tubular components may be required to undergo several makeup-breakout cycles, in particular when in service.

The conditions for use of such threaded tubular components give rise to different types of loads, which makes it necessary to use films on sensitive portions of such components such as the threaded zones, abutting zones or sealing surfaces.

Thus, makeup operations are generally carried out under a high axial load, for example because of the weight of a tube several meters in length to be connected via the threaded connection, possibly aggravated by a slight misalignment of the axis of the threaded elements to be connected. This induces risks of galling at the threaded zones and/or at the metal/metal sealing surfaces. The threaded zones and the metal/metal sealing surfaces are routinely coated with lubricants.

Furthermore, the threaded tubular components are often stored then made up in a hostile environment. This is the case, for example, in an offshore situation in the presence of a saline mist or in an onshore situation in the presence of sand, dust and/or other pollutants. Thus, it is necessary to use films that combat corrosion on the surfaces which have to cooperate by makeup (threaded zones) or by interfering contact (metal/metal sealing surfaces and abutments).

Because of environmental standards, however, it appears that using greases conforming to API (American Petroleum Institute) standard RP 5A3 does not constitute a long-term solution because such greases can be extruded from the tubular components and released into the environment or into the well, resulting in plugging which necessitates special cleaning operations.

In order to overcome the problems of requiring a long-term corrosion resistance and resistance to galling and to satisfy environmental prerogatives, solid films which are dry (i.e. not pasty like greases) which are lubricating and protective have been developed.

Dry films incorporating lubricating oils into organic matrixes have been developed for functions which, for example, are lubricating functions.

This is the case with SMI's document (WO 2010/114168), which pertains to a dry film based on a thermoplastic EVA copolymer including a lubricating oil, preferably mineral, for good compatibility and having self-repair or self-maintenance properties to ensure longevity of the film under friction. However, that type of solution limits the concentration by weight of lubricating oil to 10%, since a higher concentration would bring about a loss of adhesion at the interface between the film and the substrate and would furthermore render the surface of the film tacky to regards dust, sand, etc.

Other developments have been made by directly incorporating silicone oils into a flow-resistant thermoplastic polymer matrix at the origin of high friction under shear. The principle means that a low shouldering torque can be maintained in a threading zone in a contact situation without affecting the torque on shoulder resistance. That innovation can in particular facilitate determination of the ideal makeup torque and ensure a seal of the connection during makeup. However, those solutions, which means that a low shouldering torque can be obtained during the initial makeup procedures for a torque on shoulder resistance of 100% or more of the reference value for an API5A3 grease, does not offer that advantage after a large number of successive makeup procedures.

Another pathway has also been explored in patent application WO 2010/073120 pertaining to co-depositing lubricating oils micro-encapsulated in an electrochemical deposit of Ni or Cu or Ni—Cu. By that means, properties of anti-galling and lubrication can be combined in a single surface treatment without having recourse to a supplementary lubricating layer. However, the electrochemical pathway cannot be used to produce homogeneous, reproducible deposits easily on a threaded system and has non-negligible costs.

By way of alternative, the Applicant has looked at solutions employing organic matrixes in order to obtain a wider range of formulations which, moreover, can be produced using simpler processes.

In particular, the present invention concerns a tubular element intended for drilling and/or working hydrocarbon wells, having an end portion comprising at least one threaded zone, characterized in that the end portion is at least partially coated with a dry film (i.e. not tacky to the touch at ambient temperature) comprising a thermoplastic or thermoset matrix including microcapsules filled with compounds in the liquid form.

Optional characteristics, which are complementary or substitutional, are defined below.

The microcapsules may comprise at most 85% by weight of hydrophobic liquid compounds with a kinematic viscosity of less than 2000 $mm^2/s$ at 100° C.

The microcapsules may have a size in the range 1 to 60 μm, preferably in the range 2 to 10 μm in diameter.

The membrane of the microcapsules may be constituted by at least one wall of melamine-formaldehyde resin, preferably a double wall.

The matrix may comprise in the range 1% to 25% by weight of microcapsules.

The compounds may be included in the family defined by linear polydimethylsiloxanes with a kinematic viscosity in the range 100 to 12500 mm²/s at 25° C. and with a molecular mass in the range 10000 to 80000 g/mole, perfluoropolyethers with a kinematic viscosity in the range 5 to 200 mm²/s at 100° C. and a molecular mass in the range 1500 to 13000 g/mole, synthetic oils of the polyalphaolefin or polyalkyleneglycol type with a viscosity index of 100 or more, synthetic esters (mono-, di- or tri-ester) combined with a trimellitate ester, polymer esters of the esterified α-olefin and dibasic carboxylic acid copolymer type with a kinematic viscosity in the range 15 to 65 mm²/s at 100° C., alkyl polysulphides, sulphurized olefins, fatty acid esters, sulphurized synthetic esters, sulphurized natural triglycerides, calcium sulphonates based on alkylarylsulphonic acids, calcium carbonate sulphonates with an alkalinity in the range 100 to 500 mg·KOH/g, phosphoric ester salts, phosphorus-containing esters, preferably alkylarylphosphates or phosphonates, fatty phosphites, organic or inorganic salts of amine-containing derivatives such as imidazole or triazole derivatives, polybutenes, polyisobutylenes with a kinematic viscosity in the range 10 to 1000 mm²/s at 100° C., alkyl polymethacrylates with a kinematic viscosity in the range 30 to 2000 mm²/s at 100° C., polysulphide silanes or mercaptosilanes, and potassium triborates in suspension in mineral oil.

The micro-encapsulated compound may be a lubricating oil selected from silicone, fluorinated and synthetic ester oils.

The matrix may comprise in the range 1% to 15% by weight of micro-encapsulated lubricating oil, preferably in the range 5% to 10% by weight.

The matrix may be a thermoplastic polymer selected from copolyamides, ethylene-vinyl acetate copolymers, ethylene butyl acrylate and olefinic resins.

The matrix may be a thermoset polymer selected from polyureas, polyurethanes and fluorourethanes.

The matrix may comprise a tackifying resin selected from terpene resins based on alpha pinene, rosin and resin acids esterified with pentaerythritol, hydrogenated rosin and resin acids esterified with glycerine, and polymerized rosins.

The matrix may comprise one or more additives selected from solid lubricants, corrosion inhibitors, waxes, plasticizers and antioxidants.

The coated portion of the end portion may have undergone a surface preparation of the type selected from the group formed by sand blasting, conversion treatments, electrolytic deposition, and non-reactive treatments. The whole of said threaded zone may be coated with a dry film.

The end portion may comprise at least one sealing surface intended for metal/metal contact, and said sealing surface is coated with a lubricating dry film.

The invention also pertains to a tubular connection intended for drilling and/or working a hydrocarbon well comprising at least one tubular element having an end portion, characterized in that said end portion is at least partially coated with a dry film comprising a thermoplastic or thermoset matrix including microcapsules filled with compounds in the liquid form.

The features and advantages of the invention will be described in more detail in the description which follows, made with reference to the accompanying drawings.

Figure 1:
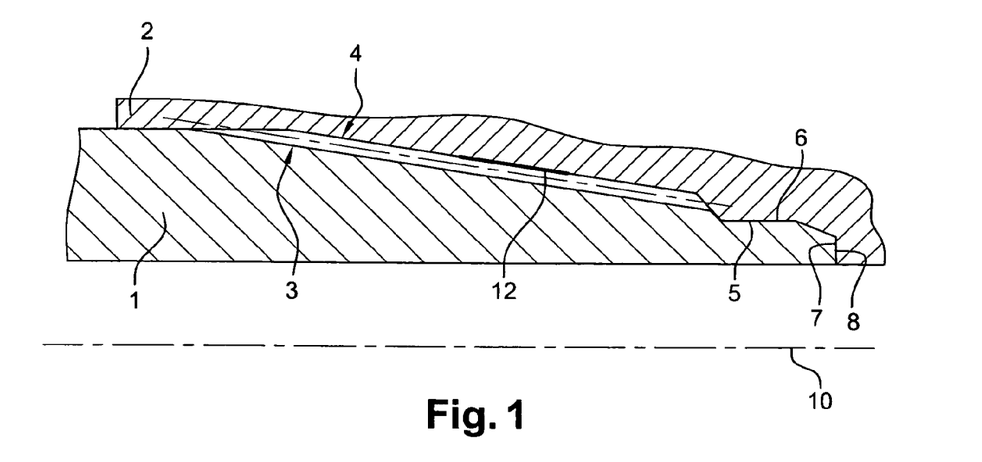
FIG. 1 is a diagrammatic view of a connection resulting from connecting two tubular components by makeup.

The threaded connection shown in FIG. 1 comprises a first tubular component with an axis of revolution 10 provided with a male end portion 1 and a second tubular component with an axis of revolution 10 provided with a female end portion 2. The two end portions 1 and 2 each have a terminal surface which is disposed perpendicular to their respective axis of revolution 10 and are respectively provided with a threaded zone 3 and 4 which cooperate mutually for mutual connection of the two components by makeup. The threaded zones 3 and 4 may be of the trapezoidal, self-locking, or other thread type. Furthermore, metal/metal sealing surfaces 5, 6 intended to come into sealed interfering contact against each other after connecting the two threaded components by makeup are provided respectively on the male 1 and female 2 end portions close to the threaded zones 3, 4. The male end portion 1 has a terminal surface 7 which comes into abutment against a corresponding surface 8 provided on the female end portion 2 when the two components are made up one into the other.

In a variation, the abutment between the terminal surface 7 and the corresponding surface 8 may be replaced by self-locking interfering cooperation of the threaded zones 3, 4 of the type described, for example, in U.S. Pat. No. 4,822,081, U.S. RE 30 647 or U.S. RE 34467.

Figure 3:
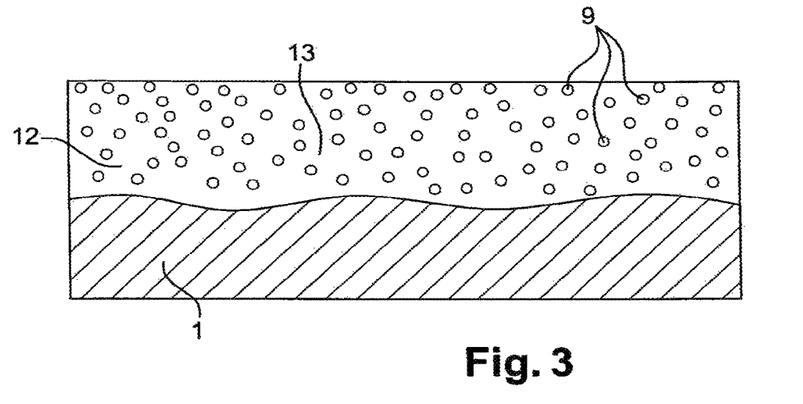
FIG. 3 is a diagrammatic view of a substrate coated with a lubricating dry film.

As can be seen in FIGS. 1 and 3, the end portion 1 or 2 of at least one of the tubular components is coated at least in part with a dry film 12 comprising a thermoplastic or thermoset matrix 13 including microcapsules 9 filled with compounds in the liquid form.

The term "dry film" means a solid film which is not tacky to the touch.

More precisely, the present invention pertains to the micro-encapsulation or nano-encapsulation of substances which are heterogeneous to the matrix, in particular lubricating oils, to reduce friction and to provide the dry film with improved functional properties. The lubricating dry film consists of a thermoplastic or thermoset polymer matrix incorporating microcapsules.

It is important to make it clear that the present invention also encompasses dry films with a thermoplastic or thermoset polymer matrix employing micro-encapsulation of other active principals such as:

liquid or volatile corrosion inhibitors known to be highly reactive as a function of temperature;

over-based calcium sulphonates which are interesting because of their anticorrosion and extreme pressure properties;

sulphur-containing oils, or esterified and sulphurized vegetable oils because of their extreme pressure properties;

polysulphide silanes or mercaptosilanes for their anti-wear, anti-fatigue and extreme pressure capacities;

phosphate or phosphoric esters for their anti-wear and friction modification properties;

potassium triborate in suspension in mineral oil, for its anti-friction properties.

Micro-encapsulation of these active principals, in particular in a thermoplastic polymer matrix, means that constraints regarding miscibility and reactivity can be overcome and release becomes possible under compression/shear during makeup or breakout of the connection in order to prolong an effect over time, such as galling resistance and lubrication respectively in the case of oils or corrosion resistance in the case of a failure of a seal for corrosion inhibitors.

The Applicant has in particular focussed upon the micro-encapsulation of lubricating oils with the aim of reducing friction. Using oils primarily means that self-lubricating films can be formed, especially thermosettable films with low film formation kinetics (for example epoxy, polyurethane, mono- or bi-component). The notion of surface friction is replaced by the notion of including a lubricant which is progressively made available during wear by abrasion of the dry film. Inclusion of the oil must not in any case affect the adhesive properties of the substrate, which would risk destroying the anticipated self-lubricating mechanism.

Thus, the Applicant has envisaged micro-encapsulating liquid substances, in particular oils, to reduce friction. Preferred lubricant oils are those included in the following categories:
- linear polydimethylsiloxane with a kinematic viscosity in the range 100 to 12500 mm$^2$/s at 25° C. and with a molecular mass in the range 10000 to 80000 g/mole;
- perfluoropolyether with a kinematic viscosity in the range 5 to 200 mm$^2$/s at 100° C. and a molecular mass in the range 1500 to 13000 g/mole;
- synthetic oils with a viscosity index of 100 or more of the polyalphaolefin or polyalkyleneglycol type;
- synthetic esters (mono-, di or tri-ester) with an acid number <0.01 mg·KOH/g, more particularly trimellitate esters;
- polymer esters of the esterified α-olefin and carboxylic acid copolymer type with a kinematic viscosity in the range 15 to 65 mm$^2$/s at 100° C.;
- mineral and vegetable oils.

The extreme pressure and anti-wear lubricating oils described are preferably included in the following categories:
- alkyl polysulphides, principally di-tertiododecyl pentasulphide;
- sulphurized olefins, fatty acid esters, sulphurized synthetic esters or sulphurized natural triglycerides;
- calcium sulphonates based on alkylarylsulphonic acid, calcium carbonate sulphonate with an alkalinity in the range 100 to 500 mg·KOH/g;
- phosphoric or thiophosphoric ester salts;
- phosphorus-containing esters, preferably alkylarylphosphates or phosphonates;
- fatty phosphites.

The volatile corrosion inhibitors may be in a solvent-containing or oily solution and are preferably included in the following categories:
- organic or inorganic salts of amine-containing derivatives, such as imidazole or triazole derivatives.

Other liquid substances in the following categories may be included:
- polybutenes, polyisobutylenes with a kinematic viscosity in the range 10 to 1000 mm$^2$/s at 100° C.;
- alkyl polymethacrylates with a kinematic viscosity in the range 30 to 2000 mm$^2$/s at 100° C.;
- polysulphide silanes or mercaptosilanes;
- potassium triborate in suspension in mineral oil.

The microcapsule is constituted by a membrane or wall formed from polymer and with primarily liquid contents. Various chemical or physical methods exist for micro-encapsulating liquid components or particles. In the present invention, the microcapsules are synthesized using the interfacial aqueous solution chemical polymerization method. This micro-emulsification method is characterized by the formation of walls via a rapid polymerization by a reaction for polycondensation of monomers at the surface of the component to be encapsulated.

More specifically, the multi-functional polymer is dissolved in the oil to be micro-encapsulated. This solution is dispersed in an aqueous phase at an alkaline pH with or without a reagent. The membrane or wall may be obtained from monomers such as polystyrene, polyvinyl alcohol, gelatin, gum Arabic, polyimide, and preferably an aminoplast.

Aminoplasts have exceptional hardness and rigidity (the tensile strength may exceed 10 GPa), as well as very substantial abrasion resistance.

Preferred aminoplasts use a melamine-formol monomer as the material for the membrane. The associated melamine-formaldehyde thermoset resin has a negligible water take-up (wall highly impermeable), and improved hardness and thermal and chemical resistances compared with urea-formaldehyde formaldehyde resins since melamine, compared with urea, has a supplemental —NH$_2$ group, which is bivalent and cyclized.

The liquid substances are preferably hydrophobic, such as fluorinated silicone oils, but also mineral oils or synthetic esters. Advantageously, the viscosity of the oils must be less than 1000 mm$^2$/s at 100° C., otherwise aqueous phase encapsulation would be limited to higher viscosities.

Modulating the number of walls of melamine-formaldehyde resin means that environmental requirements can be complied with (such as, for example, heat resistance), as well as the pressure constraints for release of the contents.

In the present invention, the number of successive walls is in the range one to three in order to ensure:
- application over a wide range of shear/compressive loads as a function of the makeup zone and the number of walls of the microcapsule;
- good shear resistance under agitation using a mechanical mixer and under shear by spraying, and as a consequence good integrity of the microcapsules;
- good maximum heat resistance of the micro-encapsulated substances that can be incorporated into a high melting point thermoplastic polymer matrix.

According to thermogravimetric analyses in air, thermal degradation of silicone oil microcapsules occurs from 370° C. for microcapsules with double walls of melamine-formaldehyde resin and thermal oxidation of the silicone oil is displaced by at least 80° C. towards higher temperatures.

Advantageously, triple walls of melamine-formaldehyde resin have a heat resistance of at least 300° C. (continuous) and of the order of 350° C. (localized). The mechanical resistance of the melamine-formaldehyde resin may also be increased by carrying out a thermal post-treatment at 260° C. of the triple-walled microcapsule in order to be able to rupture the microcapsule at higher Hertz pressures.

Advantageously, the microcapsules obtained are spherical and their size is in the range 2 to 60 μm, and primarily in the range 2 to 10 μm.

Advantageously, the microcapsules of silicone oil of the linear polydimethylsiloxane type with a kinematic viscosity of 1000 mm$^2$/s are incorporated, with agitation using a mechanical mixer, into a thermoplastic polymer matrix of the copolyamide type based on a dimeric acid.

Advantageously, a surface preparation treatment is carried out in the form of a ternary electrolytic deposit of Cu—Sn—Zn.

The lubricating dry film 12 may cover all or a portion of the threaded zone 3,4.

The lubricating dry film 12 may cover all or a portion of the metal/metal sealing surface 5, 6.

The tests consist of evaluating a certain number of parameters, in particular:
- the frictional torque at the surfaces in contact under high Hertz loads (Bridgman test);
- the adhesive force and the coefficient of friction on the substrate (Scratch test);
- the sand contamination resistance test;
- the wear resistance (pin-on-Vee test);
- the moist conditions corrosion test.

The Bridgman test can determine the tribological characteristics of dry films during a makeup operation specific for "premium" connections. More precisely, the torque on shoulder resistance CSB, also known as the ToSR, is simulated and determined. This torque arises during makeup operations specific to premium connections used in the oil industry.

Figure 2:
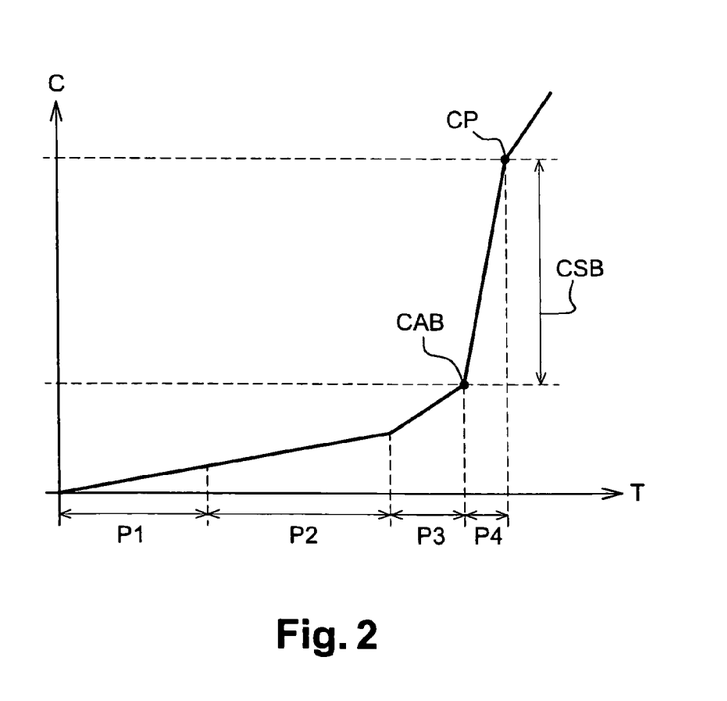
FIG. 2 is a diagrammatic view of a makeup curve for two threaded tubular components.

The curve in FIG. 2 expresses the makeup (or clamping) torque as a function of the number of rotational turns made. As can be seen, a profile for the makeup torque of "premium" connections breaks down into four portions.

In a first portion P1, the external threads of the male threaded element (or pin) of a first component of a threaded tubular connection as yet have no radial interference with the internal threads of the corresponding female threaded element (or box) of a second component of the same threaded tubular connection.

In a second portion P2, the geometrical interference of the threads of the male and female threaded elements generates a radial interference which increases as makeup continues (generating a small but increasing makeup torque).

In a third portion P3, a sealing surface at the external periphery of the end portion of the male threaded element interferes radially with a corresponding sealing surface of the female threaded element to produce a metal/metal seal.

In a fourth portion P4, the front end surface of the male threaded element is in axial abutment with the annular surface of a makeup abutment of the female threaded element. This fourth portion P4 corresponds to the terminal phase of makeup.

The makeup torque which corresponds to the end of the third portion P3 and to the start of the fourth portion P4 is termed the shouldering torque (CAB).

The makeup torque which corresponds to the end of the fourth portion P4 is termed the plastification torque (CP). Beyond this plastification torque CP, it is assumed that the male makeup abutment (end portion of the male threaded element) and/or the female makeup abutment (zone located behind the annular abutment surface of the female threaded element) is (or are) subjected to plastic deformation, which may degrade performance as regards the tightness of the contact between the sealing surfaces by plastification of the sealing surfaces as well.

The difference between the values for the plastification torque CP and the shouldering torque CAB is termed the torque on shoulder resistance CSB: CSB=CP−CAB. A threaded tubular connection is subjected to an optimum interference fit at the end of makeup, which is the guarantee for optimum mechanical strength of the threaded connection, for example as regards tensile forces, but also as regards accidental break-out in service, and for optimum sealing performances.

The designer of a threaded connection is thus obliged to define, for a given type of threaded connection, a value for the optimum makeup torque which, for all connections of this type of connection, must be lower than the plastification torque CP (in order to avoid plastification of the abutments and the resulting disadvantages) and be higher than the shouldering torque, CAB. Ending makeup with a torque which is less than CAB cannot guarantee correct relative positioning of the male and female elements and thus of an effective interference fit between their sealing surfaces. Furthermore, there is a risk of break-out. The effective value of the shouldering torque CAB fluctuates from one connection to another for the same type of connection as it depends on the diametric and axial machining tolerances of the male and female threads and sealing surfaces. The optimal makeup torque should be substantially higher than the shouldering torque CAB.

The higher the value of the torque on shoulder resistance CSB, the larger the margin for defining the optimized makeup torque, and the more the threaded connection will be resistant to operational stresses.

Figure 5:
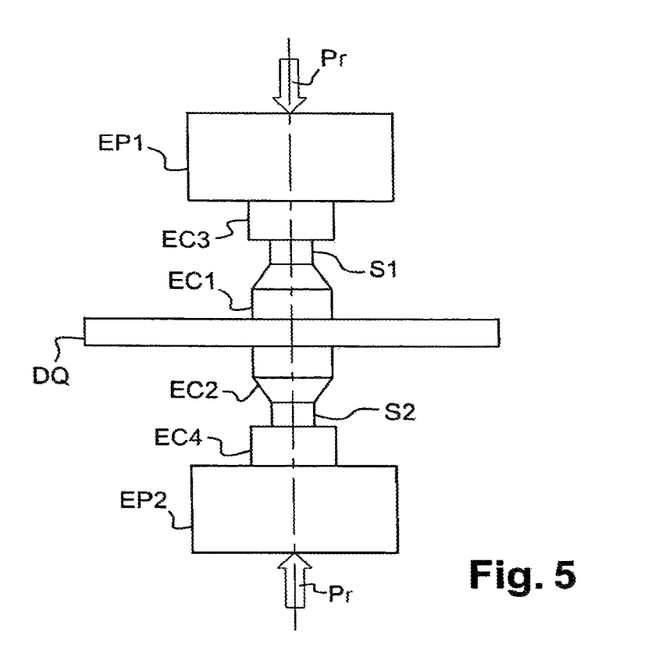
FIG. 5 is a diagrammatic view of a second test set-up.

Friction tests were carried out using a Bridgman type machine. This type of machine has in particular been described in the article by D Kuhlmann-Wilsdorf et al, "Plastic flow between Bridgman anvils under high pressures", J. Mater. Res., vol 6, no 12, December 1991. A diagrammatic and functional example of a Bridgman machine is illustrated in FIG. 5.

This machine comprises: a disk DQ which can be driven in rotation at selected speeds; a first anvil EC1, preferably conical in type, permanently attached to a first face of the disk DQ; a second anvil EC2, preferably conical in type, permanently attached to a second face of the disk DQ, opposite its first face; first EP1 and second EP2 pressure elements, such as pistons, for example, which can exert the selected axial pressures P; a third anvil EC3, preferably cylindrical in type, which is permanently attached to one face of the first pressure element EP1; a fourth anvil EC4, preferably cylindrical in type, which is permanently attached to one face of the second pressure element EP2.

To test a lubricant composition, two pieces of a material identical to that constituting a threaded element are covered with said composition in order to form the first S1 and second S2 specimens. Next, the first specimen S1 is interposed between the free faces of the first EC1 and third EC3 anvils, and the second specimen S2 between the free faces of the second EC2 and fourth EC4 anvils. Next, the disk DQ is rotated at a selected speed while applying a selected axial pressure Pr (for example of the order of 1 GPa) with each of the first EP1 and second EP2 pressure elements, and the makeup torque to which each specimen S1, S2 is subjected is measured. The axial pressure, the rotational speed and the angle of rotation are selected in the Bridgman test in order to simulate the Hertz pressure and the relative speed of the abutment surfaces at the end of makeup. Using such a machine, it is possible to fix several different pairings of parameters (makeup torque, rotation speed) in order to impose predetermined makeup torques on specimens S1 and S2, and thus to check whether these specimens S1 and S2 closely follow a given makeup torque profile, and in particular whether they can reach a number of completed turns before galling which is at least equal to a threshold value selected with respect to the selected makeup torques.

In the present case, the selected contact pressure was raised to 1 GPa and the rotation speed was raised to 1 rpm. The test specimens were formed from carbon steel, machined then coated with different dry film formulations listed in the table below along with the determination of the torque on shoulder resistance (ToSR or CSB).

Figure 4:
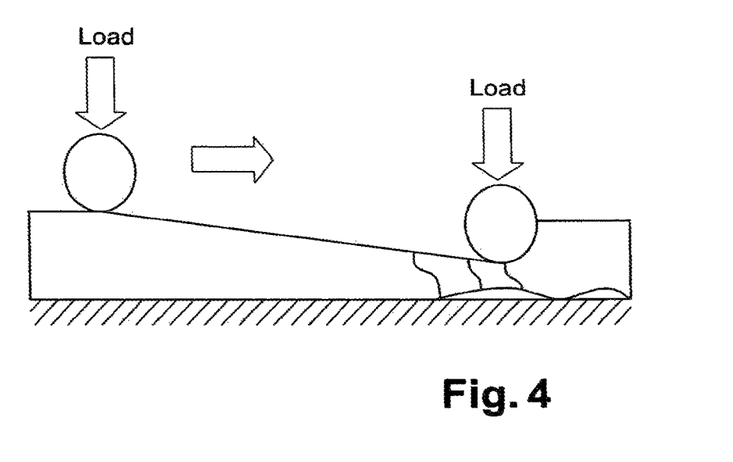
FIG. 4 is a diagrammatic view of a first test set-up.

The Scratch test, shown diagrammatically in FIG. 4, allows the adhesive force or adhesion of a film on a surface or surface preparation to be determined. This method, consisting of shearing and deforming a film with a spherical bead subjected to an increasing load, also allows two major tribological parameters to be determined, namely the coefficient of friction and the critical load corresponding to the appearance of a loss of film cohesion.

The experimental conditions employ a spherical indenter formed from Inconel 718 with a diameter of 5 mm and a metal specimen formed from carbon steel or Z20C13 with a roughness Ra of less than 1 micrometer, as well as the following parameters: a load increasing from 10 N to 310 N (with a load increase rate of 15 N/s), a rate of displacement of the bead of 2 mm/s, a duration of 20 s and a track length of 40 mm.

The sand decontamination test consists of determining the heat resistance of the film and in particular the adhesion as regards hostile environment pollutants, in particular sand in regions designated as "hot" which could influence friction during makeup. It concerns the simple, significant characterization of the softening point from which the film can no longer be cleaned using air under pressure. The experimental conditions use a metallic specimen formed from carbon steel or Z20C13 having a roughness Ra of less than 1 μm possibly with a surface preparation that may take the form of zinc phosphatation or an electrolytic Cu—Sn—Zn deposit. The specimens are coated using a film applicator. The thicknesses must be in the range 30 to 40 μm. the test conditions consist of:

applying a layer of foundry sand (d=1.36) to a pre-defined surface area of the film with a minimum of 60 cm$^2$;
heating in a ventilated oven to a test temperature in the range 75° C. to 93° C. for 1 hour;
cleaning at the test temperature using air under pressure;
determining the quantity of residual sand.

The acceptance criterion is defined as a maximum of 0.5% of residual sand.

The pin-on-Vee test is used in particular to evaluate, at high speeds, the anti-wear properties and extreme pressure properties of lubricating fluids in accordance with the standards ASTM D 2670 and ASTM D 3233 but also used to evaluate, at low speeds, solid lubricants using the ASTM D 2625 method.

The pin-on-Vee test is adapted to overcome problems with connections:

a semi-closed contact geometry (to trap the third lubricant body);
a pressure-velocity range (PV diagram) which agrees with that of the connection;
the possibility of carrying out single-direction tests or alternating mode tests for make-and-break simulations.

Figure 6:
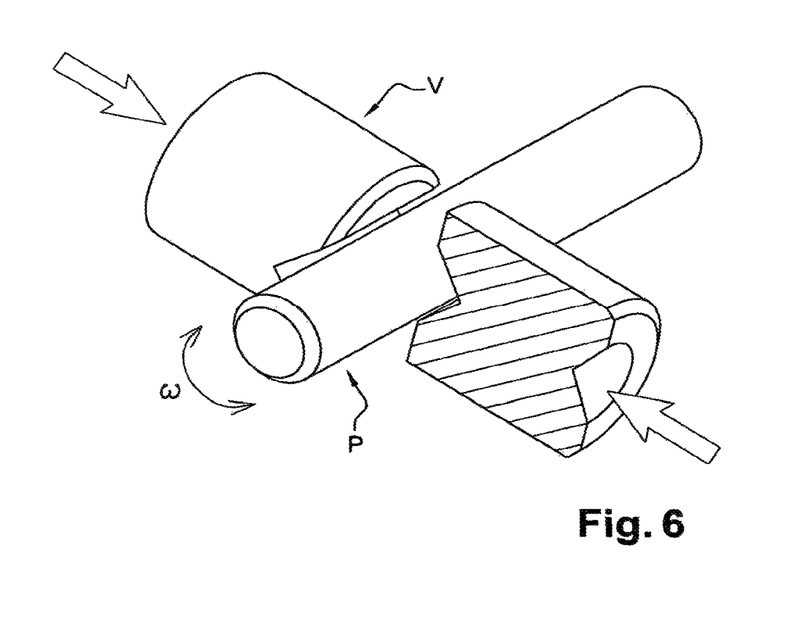
FIG. 6 is a diagrammatic view of a third test set-up.

The contact geometry of the pin-on-Vee test represented in FIG. 6 consists of a pin P formed from carbon steel or steel alloy with or without manganese phosphatation, in rotation and compressed between two V blocks in the shape of a V formed from carbon steel or steel alloy treated with an electrolytic Cu—Sn—Zn deposit or Mn phosphatation and coated with the test film with, as the test conditions, a load of 785 N, a pin rotation velocity ω of 60 rpm, a mean contact pressure of 560 MPa, and a pin sliding velocity of 20 mm/s.

The aim of this test is to simulate and evaluate the galling resistance for the various dry films without needing to carry out on-connection investigations. This test can be used to compare the performance of various films with actual on-connection tests.

The galling criterion is defined with reference to standard ASTM D 2625-4 relating to measuring the loading capacity of a film of solid lubricant and corresponds to a sudden increase in the torque compared with the initial condition of the order of 1130 N·mm or a coefficient of friction of the order of 0.15 for a load of 785 N. In general, galling is observed when the applied load decreases irrespective of the materials and the configuration.

The moist medium corrosion tests consist of a neutral saline mist test carried out in a climatic chamber at a temperature of 35° C. with a 50 g/L saline solution with a density in the range 1.029 to 1.036 at 25° C., with a pH in the range 6.5 to 7.2 at 25° C. and recovered at a mean rate of 1.5 mL/h. Specimens that are intact without rusting then have to correspond to the ReO class of ISO standard 9227 after exposure. The method provides a means of verifying that the comparative quality of a metallic material with or without a corrosion protective film (metallic or organic coating on metallic material) is maintained. The water resistance tests consist of subjecting the specimens to an accelerated corrosion test in accordance with DIN standard 50017 carried out in a climatic chamber. This test, comprising one cycle per day, consists of depositing water vapour by condensation under the following conditions: 35° C., 90% relative humidity for 8 hours, then allowing the specimen to dry. After 7 cycles, a check is made to see whether the substrate protected by the coating has corroded.

Excellent resistance must correspond to the classifications in ISO standard 4628, namely: no corrosion, no blistering, no cracking, nor flaking of a carbon steel plate treated by phosphatation with zinc (8 to 20 g/m$^2$ deposit of phosphate) or treated with an electrolytic deposit of a ternary Cu—Sn—Zn alloy with an intermediate layer of Ni.

The Applicant has in particular evaluated linear polydimethylsiloxane type silicone oils and more particularly various molecular weight grades as sold by WACKER under the trade mark WACKER FLUID AK and BLUESTAR under the trade mark RHODORSIL FLUID.

The Applicant then compared the performances with perfluoropolyether oils which are in particular supplied by SOLVAY SOLEXIS under the trade mark FOMBLIN.

The studied films may comprise one or more thermoplastic organic polymers with viscoplastic and flow-resistant behaviour such as a copolyamide resin based on a dimeric acid or an ethylene-vinyl acetate copolymer, tackifying resins, waxes, solid lubricants and corrosion inhibitors.

The films could also comprise a thermoset polymer which is 100% solid or in aqueous dispersion.

The films were applied to carbon steel or light alloy steel specimens with or without a surface treatment such as phosphatation in the case of a carbon steel or an electrolytic Cu—Sn—Zn deposit comprising a sub-layer of Woods nickel in the case of a steel alloy. The thickness of the films being studied was in the range 20 to 45 μm.

Next, the investigators checked the lubricating oil release effect in a threaded system the configuration of which will be described below. The film was applied by pneumatic spraying. The thickness of the dry film obtained was in the range 30 to 80 μm.

For this study, we primarily determined the effect of releasing, under pressure, the lubricating oil contained in the microcapsules on endurance using the pin-on-Vee test (derived from the Falex test), on the dynamic adhesion and frictional or abrasion resistance force under an increasing load using the Scratch test in a film based on thermoplastic organic polymer, and finally on the value of the torque on shoulder resistance using the Bridgman ToSR test.

The reference oil was a linear polydimethylsiloxane type lubricating oil with a kinematic viscosity of 1000 mm$^2$/s.

The reference oil was micro-encapsulated in a double-walled membrane in melamine-formaldehyde resin with no heat post-treatment.

The reference oil or micro-encapsulated reference oil was dispersed, using a mechanical agitator, in a thermoplastic organic polymer of the copolyamide type based on an acid dimer. The reference composition for the film is described in Table 1.

TABLE 1

| Chemical nature | Composition (% by weight) |
|---|---|
| Copolyamide resins, mixture | 50 to 80 |
| Secondary amide wax | 3 to 7 |
| Calcium ion exchange silica | 5 to 15 |
| Solid lubricants (graphite, PTFE) | 5 to 20 |
| Mechanical reinforcers, fillers (nanometric $Al_2O_3$ particles) | 1 to 5 |
| Linear polydimethylsiloxane (1000 $mm^2/s$ at 25° C.) | 2 to 10 |
| Antioxidants | 0 to 1 |

An alternative reference composition is described in Table 2.

TABLE 2

| Chemical nature | Composition (% by weight) |
|---|---|
| Rosin ester resin | 20 to 50 |
| EVA copolymer | 5 to 25 |
| Crystalline waxes | 5 to 25 |
| Calcium ion exchange silica | 5 to 15 |
| Solid lubricants (graphite, PTFE) | 5 to 20 |
| Mechanical reinforcers, fillers (nanometric $Al_2O_3$ particles) | 1 to 5 |
| Linear polydimethylsiloxane (1000 $mm^2/s$ at 25° C.) | 2 to 10 |
| Antioxidants | 0 to 1 |

The mass of silicone oil contained in a microcapsule depends on the number of walls of melamine-formaldehyde resin constituting the membrane and may be in the range 15% to 25% by weight.

More precisely, the concentration by weight of microcapsules is relative to the concentration by weight of silicone oil in the reference formulation.

The tests carried out using the Scratch test and shown in Tables 2 and 3 showed that, compared with using the oil directly, the progressive release of silicone oil contained in the microcapsules distributed in the thin layer improved cohesion of the polymer matrix and contributed to limiting the non-stick effect as regards the interface.

The mean coefficient of friction was equivalent between the references and the microcapsules and respectively less than 0.09 to 0.13 as a function of the concentration by weight. The design of the silicone oil microcapsules contributes simultaneously to maintaining or reducing friction and strengthening the cohesion of the material in the open contact. The minimum load for rupturing the lubricating film was 60 N in the case of a film with microcapsules, i.e. a minimum contact pressure of 220 MPa. The film remained longer in the contact during makeup.

Further, rupture of the capsules and release of the oil occurred right from application of the load, i.e. from the minimum 5 N, which corresponded to a minimum contact pressure of 100 MPa. In fact, the profile for the coefficient of friction was similar with or without microcapsules.

According to the tests, the lubricating oil effect was retained or even enhanced in the case of micro-encapsulation in a double-walled membrane.

TABLE 3

| Chemical nature | Comparative composition A (% by weight) | Comparative composition B (% by weight) | Composition C (% by weight) | Composition D (% by weight) |
|---|---|---|---|---|
| Linear polydimethylsiloxane (1000 $mm^2/s$ at 25° C.) | 5 | 10 | — | — |
| Microcapsules of linear polydimethylsiloxane oil (1000 $mm^2/s$ at 25° C.) with double wall | — | — | 6 | 12 |
| Mean CoF (5-80N) | 0.088 | 0.130 | 0.087 | 0.125 |
| Slide zone (N) | 40-57 | 40-58 | 60-75 | 75-129 |

TABLE 4

| Chemical nature | Composition C (% by weight) | Composition E (% by weight) | Composition F (% by weight) | Composition G (% by weight) |
|---|---|---|---|---|
| Double-walled microcapsules | 6 | — | — | — |
| Reinforced triple-walled microcapsules | — | 1 | 6 | 12 |
| Mean CoF (5-80N) | 0.087 | 0.126 | 0.108 | 0.125 |
| Slide zone (N) | 60-75 | 40-50 | 50 | >80 |

Comparative tests were carried out using the same reference to evaluate the galling resistance. The configuration was a Vee block formed from carbon steel with an electrolytic Cu—Sn—Zn deposit and an as-machined carbon steel pin. Only the Vee block was coated. The results are shown in Tables 5 and 6.

TABLE 5

| Chemical nature | Comparative composition A (% by weight) | Comparative composition B (% by weight) | Composition C (% by weight) | Composition D (% by weight) |
|---|---|---|---|---|
| Linear polydimethylsiloxane (1000 $mm^2/s$ at 25° C.) | 5 | 10 | — | — |
| Microcapsules of linear polydimethylsiloxane oil (1000 $mm^2/s$ at 25° C.) with double wall | — | — | 6 | 12 |
| Distance before galling (m) | 41 | 30 | 81 | 42 |

TABLE 6

| Chemical nature | Composition C (% by weight) | Composition D (% by weight) | Composition E (% by weight) | Composition F (% by weight) |
|---|---|---|---|---|
| Double-walled linear polydimethylsiloxane oil microcapsules (1000 mm$^2$/s at 25° C.) | 6 | 12 | — | — |
| Reinforced triple-walled linear polydimethylsiloxane oil microcapsules (1000 mm$^2$/s at 25° C.) | — | — | 1 | 6 |
| Distance before galling (m) | 81 | 42 | 51 | 77 |
| Mean coefficient of friction before galling | 0.139 | 0.161 | 0.125 | 0.120 |

The galling resistance was considerably enhanced with micro-encapsulated silicone oil compared with the reference, irrespective of the break strength of the microcapsule. At equal concentrations, the distance before galling was increased by at least 25% with respect to the reference. Further, the test revealed that the optimum concentration of microcapsules had to be less than 12% of the total formulation weight. The pin-on-Vee test confirms the importance of using the micro-encapsulated form of the silicone oil to guarantee a better re-agglomeration of the film in the contact.

In order to validate the first results, the Applicant made up a 7" 29# L80 VAM TOP—HH PFBS connection in the configuration in which the carbon steel coupling was treated with an electrolytic Cu—Sn—Zn deposit and the carbon steel pin was treated by zinc phosphatation and coated with a UV curable acrylic resin described in document WO 2006/104251.

The makeup torque for a no-oil reference was 21000 N·m. The pin/box system was cleaned using compressed air between each connection/disconnection step. Under these conditions, a no-oil reference did not allow shouldering.

Tables 7 and 8 show the various results of the comparative makeup for the 7" 29# L80 VAM TOP connections coated in one case with a dry film comprising a linear polydimethylsiloxane oil (1000 mm$^2$/s at 25° C.) incorporated into the matrix and in the other cases with a dry film comprising microcapsules of linear polydimethylsiloxane oil (1000 mm$^2$/s at 25° C.) with a double wall or reinforced triple wall.

TABLE 7

| Product name | Number of makeup/breakout steps without galling | 1$^{st}$ shouldering torque (N · m) |
|---|---|---|
| Comparative composition A Linear polydimethylsiloxane (1000 mm$^2$/s at 25° C.) | 6 | 15000 |
| Composition C Linear polydimethylsiloxane oil microcapsules (1000 mm$^2$/s at 25° C.), double-walled | 12 | 9600 |

TABLE 8

| Product name | Number of makeup/breakout steps without galling | 1$^{st}$ shouldering torque (N · m) |
|---|---|---|
| Comparative composition G Linear polydimethylsiloxane (1000 mm$^2$/s at 25° C.) | 10+ | 13250 |
| Composition H Linear polydimethylsiloxane oil microcapsules (1000 mm$^2$/s at 25° C.), triple-walled, reinforced by heat treatment | 22 | 12200 |

Given there is no shouldering for an oil-free reference, micro-encapsulation of the oil contributes to reducing the value of the shouldering torque included therein compared with the reference with no oil. Reduction of the value of the shouldering torque was a minimum of 10% irrespective of the matrix and the number of walls. At the same time, the galling resistance was multiplied by a minimum of two.

Figure 7:
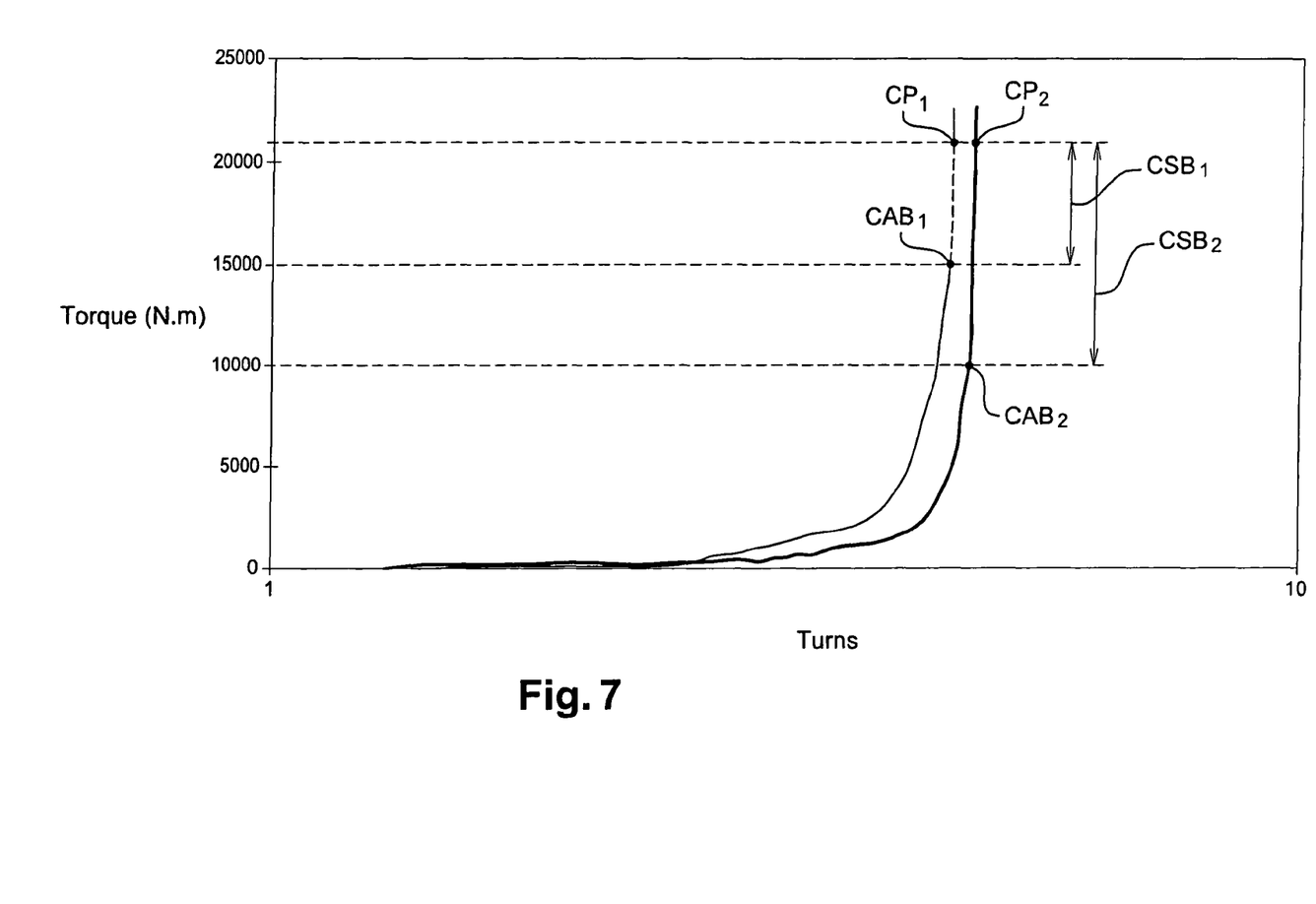
FIG. 7 is a diagrammatic view of a curve comparing the makeup of two compositions respectively comprising a lubricating oil and the same lubricating oil which has been micro-encapsulated.

Advantageously and as can be seen in FIG. 7, the value of the shouldering torque CAB and the galling resistance are particularly improved by double-walled micro-encapsulation of the lubricating oil. In fact, it will be seen that the value of the shouldering torque CAB2 of a dry film comprising linear polydimethylsiloxane oil microcapsules was much lower than the value of the shouldering torque CAB1 of a dry film comprising a linear polydimethylsiloxane oil simply incorporated into the matrix. For this reason, the torque on shoulder resistance CSB2 of the dry film comprising linear polydimethylsiloxane oil microcapsules is optimized.

Compared with the film without oil microencapsulation, the film containing the oil microcapsules remains in the contact, in particular because of a better degree of transfer towards the pin system. The use of micro-encapsulation increases the capacity for cohesion and re-agglomeration. The bearing and abutment contact zone of the pin system, which is subjected to contact pressures of more than 500 MPa, is substantially better protected. The UV-curable acrylic resin exhibits no damage, but damage is visible in the reference case with or without oil (grinding, cracking, crazing, delamination).

The results obtained on the connection confirm the advantage of micro-encapsulation of the lubricating oil to maintain the thermoplastic flow-resistant film in the contact during makeup and to ensure superior lubrication and galling resistance.

The effect of releasing the lubricating oil on the reduction of friction was more marked in the case of makeup of the connection compared with the laboratory results where the surfaces employed were too small. In the case of connection, the confinement and the extended contact surface contributed to demonstrating the phenomenon of rupture and release of the contained oil.

At the same time, the investigators determined the value of the torque on shoulder resistance under the same conditions.

Table 9, which compares the torque on shoulder resistance between a 7" 29# L80 VAM TOP connection coated with a film with oil and a film with oil microcapsules, confirms that micro-encapsulation of the lubricating oil had no impact on the value of the torque on shoulder resistance determined with respect to the API5A3 reference grease.

TABLE 9

| Product name | Torque on shoulder resistance | Bridgman ToSR |
| --- | --- | --- |
| Comparative composition A Linear polydimethylsiloxane (1000 mm²/s at 25° C.) | 75% | 144% |
| Composition C Linear polydimethylsiloxane oil microcapsules (1000 mm²/s at 25° C.), double-walled | 78% | 144% |

Thus, the invention proposes producing lubricating films characterized by micro-encapsulation, which can be modulated, of hydrophobic liquid substances and more particularly of lubricating oil or extreme pressure oil in a thermoplastic or thermoset polymer, with the following advantages:

- a very good separation of the friction surfaces for an excellent value for the shouldering torque during the initial makeup irrespective of the contact temperature;
- self-lubrication by controlled release of the liquid lubricating substances is envisaged, as a function of the load applied in the various makeup zones;
- very good endurance to provide for a large number of successive makeup/breakout operations without galling by a combined effect of controlled release of the liquid lubricating substances in the contact and better adhesion between the matrix and the substrate;
- sufficient resistance as regards contamination by sand and dust;
- integrity of the liquid lubricating substances over a wide range of temperatures;
- maintenance of the value of the torque on shoulder resistance in the plastification zone, compared with solutions based on API greases.

The invention claimed is:

1. A tubular element configured for drilling and/or working a hydrocarbon well, comprising:
an end portion comprising at least one threaded zone,
wherein the end portion is at least partially coated with a dry film, including a thermoplastic or thermoset matrix including microcapsules filled with compounds in liquid form chosen from linear polydimethylsiloxanes with a kinematic viscosity in a range of 100 to 12500 mm²/s at 25° C. and with a molecular mass in a range of 10000 to 80000 g/mole.

2. The element according to claim 1, wherein the microcapsules comprise at most 85% by weight of hydrophobic liquid compounds with a kinematic viscosity of less than 2000 mm²/s at 100° C.

3. The element according to claim 1, wherein a size of the microcapsules is in a range of 1 to 60 μm, or in a range of 2 to 10 μm, in diameter.

4. The element according to claim 1, wherein a membrane of the microcapsules is constituted by at least one wall formed from a melamine-formaldehyde resin, or a double wall.

5. The element according to claim 1, wherein the matrix comprises in a range of 1% to 25% by weight of microcapsules.

6. The element according to claim 1, wherein the matrix comprises in a range of 1% to 15% by weight of micro-encapsulated lubricating oil, or in a range of 5% to 10% by weight.

7. The element according to claim 1, wherein the matrix is a thermoplastic polymer selected from copolyamides, ethylene-vinyl acetate copolymers, ethylene butyl acrylate, and olefinic resins.

8. The element according to claim 1, wherein the matrix is a thermoset polymer selected from polyureas, polyurethanes, and fluorourethanes.

9. The element according to claim 1, wherein the matrix comprises a tackifying resin selected from terpene resins based on alpha pinene, rosin and resin acids esterified with pentaerythritol, hydrogenated rosin and resin acids esterified with glycerine, and polymerized rosins.

10. The element according to claim 1, wherein the matrix comprises one or more additives selected from solid lubricants, corrosion inhibitors, waxes, plasticizers, and antioxidants.

11. The element according to claim 1, wherein a coated portion of the end portion has undergone a surface preparation of type selected from a group formed by sand blasting, conversion treatments, electrolytic deposition, and non-reactive treatments.

12. The element according to claim 1, wherein a whole of the threaded zone is coated with the dry film.

13. The element according to claim 1, wherein the end portion comprises at least one sealing surface configured to provide a metal/metal contact, and the sealing surface is coated with the lubricating dry film.

14. A tubular connection configured for drilling and/or working a hydrocarbon well, comprising:
at least one tubular element having an end portion,
wherein the end portion is at least partially coated with a dry film comprising a thermoplastic or thermoset matrix including microcapsules filled with compounds in liquid form chosen from linear polydimethylsiloxanes with a kinematic viscosity in a range of 100 to 12500 mm²/s at 25° C. and with a molecular mass in a range of 10000 to 80000 g/mole.

* * * * *